[11] 3,597,050

| | | | |
|---|---|---|---|
| 2,854,349 | 9/1958 | Breyfus et al. | 350/1 X |
| 2,675,740 | 4/1954 | Barkely | 350/276 X |
| 3,078,693 | 2/1963 | Lytle | 350/1 X |
| 3,192,575 | 7/1965 | Rosenau et al. | 350/1 UX |

*Primary Examiner*—David Schonberg
*Assistant Examiner*—Toby H. Kusmer
*Attorney*—Spencer and Kaye

[72] Inventor  Emile Plumat
              Gilly, Belgium
[21] Appl. No. 695,259
[22] Filed    Jan. 2, 1968
[45] Patented Aug. 3, 1971
[73] Assignee Glaverbel, S. A.
              Watermael Boitsfort, Belgium
[32] Priority Dec. 30, 1966
[33]          Luxembourg
[31]          52,726

[54] TRANSPARENT ARTICLE HAVING MODIFIED RADIATION-TRANSMITTING PROPERTIES
     11 Claims, 4 Drawing Figs.
[52] U.S. Cl. .................................................. 350/276, 350/164
[51] Int. Cl. .................................................. G02b 1/10
[50] Field of Search ...................................... 350/1, 164, 276

[56]           References Cited
               UNITED STATES PATENTS
     2,366,687  1/1945  Osterberg ........................ 350/164

ABSTRACT: A method for modifying the radiation-transmitting properties of an article composed of at least one sheet having a substantial degree of transparency to radiation and at least one layer or sheet disposed adjacent the at least one sheet and forming a screen which serves to impart to the article as a whole a reduced degree of transparency to such radiation, the method involving reducing the transparency-attenuating effect of the screen in at least one zone of the article so as to give the article different transparencies at different zones thereof. Articles having a certain degree of transparency to radiation and having different degrees of transparency at different zones thereof.

PATENTED AUG 3 1971 3,597,050

INVENTOR
Emile Plumat

BY Spencer & Kaye
ATTORNEYS.

3,597,050

TRANSPARENT ARTICLE HAVING MODIFIED RADIATION-TRANSMITTING PROPERTIES

BACKGROUND OF THE INVENTION

The present invention relates to methods of modifying the radiation-transmitting properties of a material or article, particularly an article composed of at least one sheet having a substantial degree of transparency to radiation, and facing or superimposed on such sheet or sheets, at least one sheet or layer forming a screen which gives the material or article as a whole a reduced degree of transparency to such radiation.

The invention is particularly concerned with employing such methods as a step in the manufacture of light-transmitting materials and articles, for example, vehicle windshields and glazing units, and materials suitable for use in such articles.

Modern building and vehicle designs tend to make progressively more use of light-transmitting materials in order to increase the light available in the building and vehicle interiors as well as the field of vision therefrom. However, this increase in use of such materials itself creates certain problems such as overheating of the interior of the building or vehicle due to what is sometimes called a "hot-house effect."

This problem can be solved to a certain extent by the use of a double glazing which under certain conditions can act as a barrier to solar heat radiation. Alternatively, use can be made of laminated panes, or "sandwich" panes, often incorporating sheets of plastic which may be colored or pigmented, or use can be made of sheets of glass having surface coating layers adapted to absorb and/or reflect a certain proportion of incident radiation in a particular part or parts of the electromagnetic spectrum.

A coated sheet of the latter type can be used alone or together with another sheet or sheets, for example, to form a double pane. Glazings are known, for instance, which are composed of glass coated with a layer several hundred Angstroms thick of a precious metal deposited by evaporation in vacuo, which glazings can have a reflecting power as high as 35 percent and a transparency of about 40 percent. This kind of glazing effectively screens out a considerable portion of the sun's rays, more particularly in the infrared region.

The foregoing known materials have certain disadvantages. In particular, they reduce the transmission of visible light by an undesirable amount and tend to distort the colors of objects viewed through them. Moreover, some of the coated glasses give rise to dazzle when viewed at certain angles, and this can be very objectionable particularly if the materials are used for glazing airport buildings, broadcasters' or announcers' booths, windows or portholes of ships, and in other situations.

SUMMARY OF THE INVENTION

It is a primary object of the present invention to overcome these drawbacks and difficulties.

Another object of the present invention is to improve properties of transparent articles designed to prevent or attenuate the passage of certain types of radiation.

Yet another object of the present invention is to improve the usefulness of such articles while avoiding increases in the "hot-house effect."

A still further object of the present invention is to increase the transparency of such articles in selected regions thereof.

These and other objects according to the present invention are achieved by a novel method of modifying the radiation-transmitting properties of an article composed of at least one sheet having a substantial degree of transparency to radiation, and, adjacent such sheet, at least one sheet or layer forming a screen which serves to impart to the article as a whole a reduced degree of transparency to such radiation. The method according to the present invention is carried out by modifying the screen for reducing its transparency-attenuating effect in at least one zone of the article, whereby the radiation transparency of the article then has a different value at different zones thereof.

The objects of the present invention are also achieved by certain improvements in an article composed of at least one sheet having a substantial degree of transparency to certain radiation, and an adjacent screen serving to reduce the overall transparency of the article. According to the improvements of the present invention, the screen is constructed to present at least one zone where its transparency-attenuating effect is reduced, whereby the radiation transparency of the article is different at different zones thereof.

It is to be understood that a reduction of the transparency-attenuating effect of such screen according to the present invention includes a reduction of this effect by any amount or its complete elimination. In addition, the term radiation is used herein to refer to radiation in the infrared, visible, and ultraviolet regions, which are generally considered to extend between the wavelengths of 100 A. and 375 $\mu$. The term light used herein refers to radiation in the visible region between wavelengths of 0.4 and 0.7 $\mu$.

If the transparency-attenuating effect of the screen is reduced or eliminated in a zone or zones making up, for example, the order of one-fifth the total area of the material or article, the so-called "hot-house" effect of such material or article will not be significantly greater than it was prior to the modification step according to the invention. Nevertheless, a significant practical improvement in the useful light-transmitting properties of the material or article will be achieved thereby.

The effect of the screen can be reduced or eliminated in one or more zones which are selected so that the material or article presents a maximum transparency to light at precisely those locations where this property is most important with regard to the intended use of the material or article. Thus, for example, in the case of a vehicle windshield, the effect of the transparency-attenuating screen can be eliminated or reduced in that part of the windshield which covers the field of view directly ahead of the vehicle. At the same time, the transparency-attenuating screen can be left unmodified to produce its full effect in those areas of the windshield where forward vision would in any case be obstructed by the hood, the rear view mirror, or some other part of the vehicle itself.

The transparency-attenuating screen can, for example, be constituted by one or more coating layers and/or by a sheet or sheets of plastic, coated glass, or other material. The material or article may moreover incorporate only one, or more than one, sheet in addition to any sheet forming the screen and, if there are two or more sheets, these can be parts of a laminate or they can be held in spaced relation as in known double-pane units. The invention is primarily concerned with materials or articles in which the sheet or sheets having appreciable transparency to radiation are of glass, but such sheet or sheets can also be of plastic.

Articles or groups of pieces of material according to the invention can be used to form the various windows of a vehicle, such as, for example, the windshield, rear window, side windows and, occasionally, roof windows or panels. The materials or articles can be used to particular advantage for the windows of aircraft cockpits.

In the following further description, primary consideration is given to materials and articles in which the transparency-attenuating effect of the screen is reduced or eliminated in a single zone or in two or more spaced zones, but the invention also includes embodiments in which the transparency-attenuating effect is reduced at all zones of the material or article but to an extent which varies from one zone to another.

DESCRIPTION OF THE PREFERRED EMBODIMENTS

Figure 1:
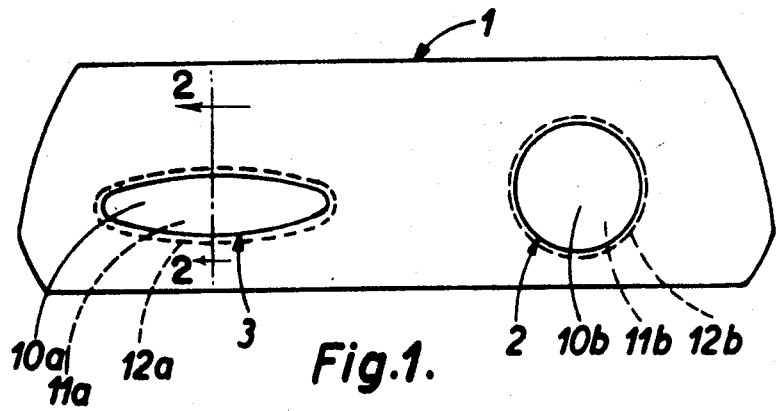
FIG. 1 is an elevational view of a vehicle windshield manufactured according to the present invention.

Preferably, the transparency-attenuating effect of the screen is reduced or eliminated in at least one zone of the material or article by attenuating its radiation-reflection characteristic in that zone. This solution is particularly applicable when the material or article is of a highly reflecting nature, due to the presence of a metal or oxide reflecting layer, for example, which considerably reduces vision through the material or article.

On the other hand, if the material or article absorbs a considerable amount of radiation, as with opaline glasses or plastics, or glasses or plastics containing pigment, the effect of the screen is advantageously reduced in at least one zone of the material or article by reducing its absorptive property in that zone.

The reflection characteristic of the screen can often be advantageously attenuated in one or more zones of the article by disposing, at such zone or zones, a layer which absorbs only a small amount of light. For example, if a slightly absorptive layer consisting of an oxide such as silica is deposited at such zone or zones, it will cause the radiation reflection by the screen to be completely eliminated in these zones.

It is moreover possible in this way to increase the total transparency of the material or article, in the zone or zones in question, to such an extent that it is higher than the transparency which the material or article would have if the screen were completely removed. Thus, starting with an ordinary glass sheet which, for example, transmits 95 percent, absorbs 1 percent and reflects 4 percent of the visible light incident thereon, and an associated screen which influences these characteristics in such a way that the combination of glass and screen transmits 80 percent, absorbs 1 percent and reflects 19 percent of the incident visible radiation, it is possible, by applying a layer, such as of $SiO_2$, which absorbs only a small amount of light, to form a zone which absorbs 1 percent, reflects only 2 percent and transmits 97 percent of the incident visible light.

As another example, a material consisting of a sheet of glass which by itself has a light transmission of 92 percent and a reflecting coating which gives the coated sheet a transmission of only 80 percent, can have the transmission increased to 95 percent by the superimposition of a silica layer whole light absorption is small.

This method of carrying out the invention is of importance because certain reflecting layers, for example, reflecting layers having $TiO_2$ as a base, adhere very securely to the surface which they coat, so that would be impossible, or at best very difficult, to increase the transparency of the article locally in one or more zones by physically modifying the reflecting layer chemically or mechanically. The problem is neatly solved, according to the present invention, by depositing on the reflecting layer a layer, such as of silicon oxide, which has a small light absorption characteristic.

Another way of reducing the transparency-attenuating effect of the screen in a given zone is to reduce the thickness of the screen, or to entirely remove one or more layers present in that zone. For example, in the case of a material composed of a plastic sheet or layer sandwiched between two sheets of glass, the plastic sheet or layer can be removed or merely reduced in thickness in a given zone or zones of the material so as to eliminate or reduce the light absorption by the plastic sheet or layer in that zone. The local cavity or cavities produced by the removal of plastic can be filled with a material having a high transparency, or light transmission, in the visible region of the spectrum, and preferably being highly absorptive in the infrared and ultraviolet regions.

The transparency-attenuating effect of the screen may be reduced uniformly over the whole of one zone or over the whole of each of two or more spaced zones, but it is for some purposes preferable for the effect of the screen to be reduced nonuniformly across one zone or across each of two or more spaced zones so that the transparency increases toward the center of such zone.

Certain embodiments of the invention, selected by way of example, will now be described with specific reference to the accompanying diagrammatic drawings.

Example 1

Figure 2:
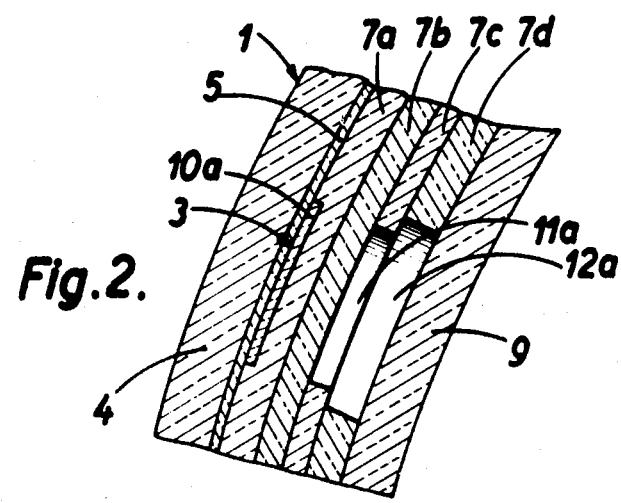
FIG. 2 is a cross-sectional view, to an enlarged scale, taken along the line 2—2 of FIG. 1.

The windshield 1 shown in FIGS. 1 and 2 is provided with a circular zone 2 and an elliptical zone 3 both having been given a high transparency according to the present invention.

Referring to FIG. 2, the windshield 1 is formed of an outer curved glass sheet 4 having a thickness of 4 mm. and on which a thin layer 5 of titanium oxide 500 A. thick is deposited by evaporation in vacuo. Four polyvinylbutyral sheets 7a, 7b, 7c, and 7d, which are each 0.25 mm. thick, are sandwiched between the glass sheet 4 and a second glass sheet 9 having a thickness of 3 mm., the sheet 7a being glued to the layer 5.

At the zone 3, there is a thin layer 10a of silicon monoxide having a thickness of 750 A. and adhering to the layer 5. The plastic sheet 7c is cut away in an area 11a coextensive with the zone 3 and the sheet 7d is cut away in a larger area 12a at that zone. The distance between the boundaries of the area 11a and 12a is about 1 mm. The existence of the two cavities 11a, 12a, having boundaries which do not coincide helps to avoid the appearance of any excessive contrast at the periphery of the zone 3 so that there is a gradual change in the optical properties of the article from locations inside this zone to locations outside the zone.

The zone 2 is similarly constituted and certain constituents of this zone are indicated in FIG. 1 with the numerals borne by the corresponding elements of zone 3, the numerals designating the elements of zone 2 being given the suffix "b" rather than "a." Thus, 10b indicates a silicon monoxide layer, while 11b and 12b represent cutaway portions of sheets 7c and 7d, respectively.

The windshield is produced by first depositing on the concave side of the glass sheet 4 the thin titanium oxide layer 5. The layer 5 is then coated at the zones 2 and 3 with the thin silicon monoxide layers 10a and 10b, respectively. The plastic sheets 7a, 7b, 7c, and 7d are then successively applied, the sheets 7c and 7d having previously had apertures 11a, 11b and 12a, 12b formed therein. Finally the glass sheet 9 is placed in position and the assembly is subjected to pressure and heated and cooled for bonding the layers together.

The titanium oxide layer 5 serves to reduce the transparency of the assembly except in those zones where it is covered by the silicon monoxide layers 10a and 10b. The effect of these latter layers is to render the assembly highly transparent in the zones 2 and 3 notwithstanding the presence of the semireflecting titanium oxide layer.

Outside the zones 2 and 3 the windshield 1 has the following average optical characteristics in the visible region of the spectrum:

appearance in reflection = bluish grey
percent of reflection = 40
percent of absorption = 20
percent of transparency = 40

These characteristics are such as to considerably reduce the "hot-house" effect. The interior of a vehicle having all of its windows completely glazed with a material having these characteristics heats up to only 25° C. in full sunlight, while the same vehicle with ordinary transparent windows develops an interior temperature of 50° C. Due to the screening effect, the dark colored internal surfaces of the vehicle (steering wheel, upholstery) will be at a temperature which causes no discomfort.

In the zones 2 and 3 the average optical characteristics in the visible region of the spectrum are as follows:

appearance in reflection = very pale blue
percent of reflection = 14
percent of absorption = 6
percent of transparency = 80

A vehicle which has a windshield 1 as described with reference to FIGS. 1 and 2, and which has its other windows glazed with a material having the same characteristics as the area of the windshield outside the zones 2 and 3 develops an interior temperature of only 26° C. under identical full sunlight conditions. Clearly, therefore, the presence of the zones 2 and 3 in the windshield 1 causes no significantly increased "hot-house" effect. Moreover, the driver and his front seat passenger have excellent vision of the road in twilight and are no longer dazzled by the sun's rays. The location of the zones 2 and 3 is such that there is little or no risk of a driver coming in the opposite direction being dazzled by the reflection from these zones of headlight beams or of the sun's rays at certain angles of light incidence.

The cavities 11a, 11b, 12a and 12b can, if desired, contain a substance, in the form of a thin film or sheet, having advantageous optical properties, for instance, a yellow-transmitting substance.

Example 2

Figure 3:
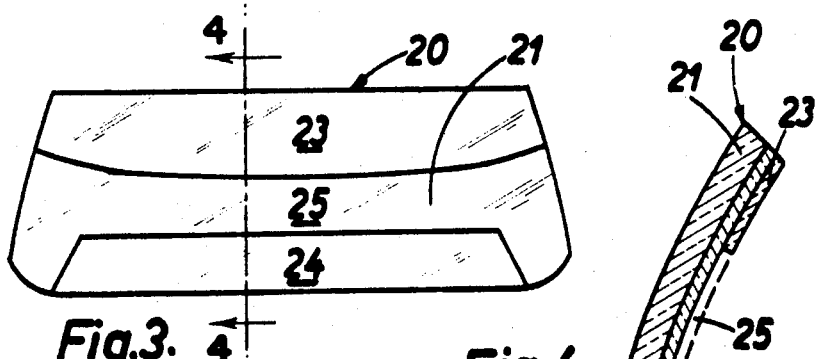
FIG. 3 is a front view of another form of construction of a vehicle windshield manufactured according to the present invention.
Figure 4:
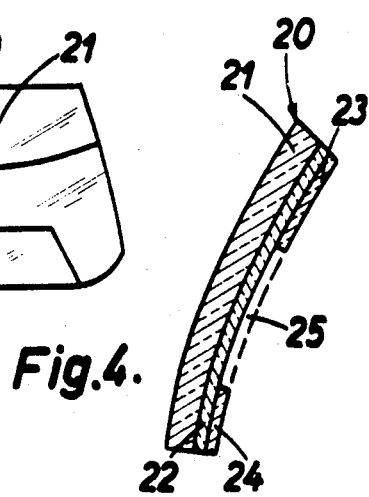
FIG. 4 is a cross-sectional view, to an enlarged scale, taken along the line 4—4 of FIG. 3.

The windshield 20 shown in FIGS. 3 and 4 comprises a curved glass sheet 21 covered over its whole surface with a thin titanium layer 22 having a thickness of about 50 A. and deposited by any known technique. The layer 22 is coated in the upper zone of the windshield 20 with a layer 23 which strongly reflects ultraviolet radiation. The layer 23 is composed, for example, of 70 percent $TiO_2$ and 30 percent of $Fe_2O_3$ and has a thickness of 400 A. In the lower zone of the windshield 20 the layer 22 is coated with a thin titanium oxide layer 24 which is 500 A. in thickness. The layers 22, 23 and 24 together attenuate the transparency of the windshield.

In the ultraviolet and the near-visible regions of the spectrum the layer 23 has an energy transmission of 20 percent for a light transmission of 57 percent. In transmission, the layer 23 has a deep yellow color, while in reflection it has a slightly bluish purple tint.

The layer 24 is of such size and shape that, for a driver seated in a normal driving position, it conforms generally with the outline of the vehicle hood as seen by the driver through the windshield 20.

In the manufacture of the windshield, the concave side of the glass sheet 21, after being covered with the titanium layer 22, is covered in the zones where layers 23 and 24 are to be formed with protective masks, for example, of paper, whereafter there is sprayed onto the zone 25 a varnish which can readily be removed from the glass after it has dried. The masks are then removed, and the thin layers 23 and 24 hereinbefore described are deposited, for example, by spraying a solution thereof. When the layers 23 and 24 have been formed and dried, the varnish covering the zone 25 is peeled off.

The concave side of the windshield 20 can then be covered with a glass or plastic sheet of the same shape as the windshield, for protecting the layers 23 and 24 against accidental damage. Extra security against damage is achieved if a sealed double glazing unit is formed by the windshield 20 and the protective sheet.

The layer 23 cuts out a considerable proportion of the ultraviolet rays, more particularly when the sun is at its zenith and is therefore very intense. The layer 24 contributes towards avoiding the "hot-house" effect and does not in any way impede vision of the road since the driver's view of the latter is in any case obstructed in this region by the vehicle hood.

The transparency of the windshield is attenuated in its upper and lower zones by the screen formed by coating layers 22, 23 and 24. In those zones the windshield has its transparency reduced by some 25 percent—40 percent by those layers. In the zone 25 where only the coating layer 22 is present, the windshield has a high transparency of the order of 80 percent. This much higher transparency is due in part to the absence of a second coating in zone 25 and in part to the fact that when the peelable varnish is removed, it takes with it a stratum of about 20 A.—40 A. of titanium from layer 22. The reflecting effect of the titanium layer 22 is therefore considerably reduced in the zone 25, all the more so since the small thickness of titanium still present in the zone 25 is partly converted on contact with the glass into titanium oxide, which is less reflective than metallic titanium.

The zone 25 extends from the left-hand edge to the right-hand edge of the windshield, providing a satisfactory field of forward vision for the driver and his passengers. The disadvantages hereinbefore referred to, namely dazzle, overheating of the vehicle and inadequate vision in twilight are obviated, or at least substantially reduced.

Some various features can advantageously be brought, without departing from the scope of the invention. Such is the case of an arrangement wherein the screen is maintained in spaced relation to at least one of its constituting sheet(s). Referring to FIGS. 1 and 2, for instance, sheet 1 can be spaced from screen 5, from about 1 millimeter or more, which can be found of interest for assembly purposes, or in order to avoid the existence of interference colors, appearing if the sheets are not perfectly plane.

In addition to the specific examples described above, the present invention includes any material or article combining at least one sheet having a substantial degree of transparency to certain radiation, and a facing or superimposed screen composed of one or more sheets or layers and reducing the transparency of the material or article, the effect of such screen having been attenuated in one or more zones so that the radiation transparency of the material or article is different in different zones thereof.

It may be seen that the screen may be formed by one or more sheets or layers extending over an area corresponding with that of the other sheet component or components of the material or article and the screen may be thinner in one or more zones than at other places. Thus, the screen may be composed of a plastic sheet or layer sandwiched between two sheets of glass, such sheet or layer being of reduced thickness in a particular zone or zones or extending only over a part or parts of the total light-transmitting area. The recess where the sheet or layer is of reduced thickness or the zone or zones over which the sheet or layer does not extend can be filled with a material having high transparency in the visible region of the spectrum and preferably having a high absorption power in the infrared and ultraviolet regions as previously mentioned.

A material or article as above defined may, as a further example, incorporate a light-reflecting layer which reduces the transparency of the article, and, superimposed on such layer in a given zone or zones, a layer with only slightly light-absorbing properties. As described in connection with methods according to the invention, the reflecting layer may be an oxide or a metal layer and the slightly absorptive layer may be a silica layer. The effect of the absorptive layer may be to render the zone or zones in which it is present more transparent than the material or article would be in the absence of the reflective layer.

There may be one or more clearly defined zones within which the transparency is uniformly greater than at other places in the light-transmitting area, the shape or shapes of such zones being selected according to the intended use of the material or article.

Thus, in the case of a window covering a measuring instrument dial which must be shielded from light as much as possible, there may be a sectoral zone of high transparency covering the arc of the instrument scale and the movement of the pointer, the surrounding area being of substantially less transparency.

On the other hand, for some purposes it is better for the transparency-attenuating effect of the screen to be reduced in a nonuniform manner over the area of one or more zones. For example, in the case of vehicle windshields and television implosion protection sheets, the perimetral zone of which should be highly light-absorptive so as to conceal the picture distortions at the screen margins, this gradation in the transparency has a more restful effect on the eye.

An important field for use of the present invention is that of vehicle glazings. Materials according to the invention for use as vehicle windows, and possible a roof panel or panels, can be highly reflective, but a zone of the windshield, and if necessary a zone of the rear window, can have a transparency which is higher than the rest of the reflecting glazings, or even higher than glass without a reflecting layer.

Even if such zones of higher transparency occupy a fifth or even a quarter of the total windshield and rear window area, they do not significantly increase the "hot-house" effect. On the other hand, the higher transparency zones can be placed so as to cover the whole of the driver's field of vision forwardly and through the rear window. In addition, dazzle effects constituting hazards to other road users can be avoided over a considerable range or angles of incidence.

Glazing material according to the invention can also be used with advantage for windows in apartment and office buildings, ships, aircraft, commentators' booths and other structures.

There are cases in which it is advantageous for the zone or zones of greatest transparency to extend from one boundary to another of the material or article. For example, in a vehicle windshield it may be desired to provide a substantially horizontal zone of higher transparency extending from the left-hand edge to the right-hand edge thereof, and of a height such that any driver and his passenger can clearly see all details of the road not hidden by the vehicle hood.

The presence of high transparency zones extending between opposed edges of the material is also useful in light-transmitting windows affording protection to personnel against intense heat radiation while permitting observation of control panels through the window from a sitting or standing position. In such a case the glazing can be made strongly reflecting, except along two vertically spaced linear zones extending from left to right, such zones having enhanced transparency.

According to other embodiments, there can be at least one zone in which the screen has no, or comparatively little, effect on transparency and which is completely surrounded by a region in which the screen is completely effective. For example, as described above, a vehicle windshield may have a circular high transparency zone directly in front of the driver, the rest of the windshield having its transparency reduced by the presence of one or more semireflecting or absorptive layers.

In the case of a curved material, e.g., a curved vehicle windshield, it is advantageous for the higher transparency zone or zones to lie in the area or areas which will be substantially vertical when the material is installed, because it is light reflected from vertical or nearly vertical surfaces of a windshield which is most likely to dazzle drivers of other vehicles, whether in daylight or at night.

The difference in the radiation transparencies of different zones of the material or article may be a difference in their transparencies to radiation in a particular region of the spectrum. Thus, a given zone may be more transparent to ultraviolet and/or infrared rays, or more transparent to certain visible light radiation. For instance in the case of glazing materials for vehicles, a zone of higher transparency to yellow light will be advantageous when using roads lit by sodium lamps.

If the screen consists of or includes a self-supporting sheet in addition to the sheet or sheets having a substantial degree of transparency to certain radiation, the screen can be supported in spaced relation to such other sheet or sheets, e.g., by spacing elements at the sheet margins, so as to form a double or multiple glazing unit.

It will be understood that the above description of the present invention is susceptible to various modifications, changes, and adaptations, and the same are intended to be comprehended within the meaning and range of equivalents of the appended claims.

I claim:

1. In an article composed of at least one sheet having a substantial degree of transparency to certain radiation, and an adjacent reflecting screen constituting means for reducing the overall transparency of the article to such radiation, said screen being constructed to present at least one zone where its transparent-attenuating effect is less than in regions of said article adjacent such zone, whereby the transparency of said article is different at different zones thereof, the improvement wherein said screen comprises: a first layer having a substantial radiation-reflecting characteristic; and a second layer made of a material which has the property of absorbing only a small percentage of incident light, superimposed on said first layer in such at least one zone for causing the transparency of said article to be greater in such at least one zone than at other regions thereof.

2. An arrangement as defined in claim 1, wherein said article presents at least one zone across which the transparency is uniformly higher than it is in at least one adjacent area of said article.

3. An arrangement as define din claim 1 wherein said screen is constructed to present at least one zone in which the transparency of said article increases from the marginal regions of such zone to the center thereof.

4. An arrangement as defined in claim 1 wherein said screen is maintained in spaced relation to said at least one sheet.

5. An arrangement as defined in claim 1 wherein said screen is coextensive with said at least one sheet.

6. An arrangement as defined in claim 1 wherein said screen is constructed so that said at least one zone is spaced inwardly from the boundaries of said article.

7. An arrangement as defined in claim 1 wherein said at least one sheet is made of glass.

8. An arrangement as defined in claim 1 wherein said article constitutes a vehicle windshield and wherein said at least one zone defines a central band extending across said windshield.

9. An arrangement as defined in claim 1 wherein the transparencies of said article at different zones thereof are different with respect to radiation extending over a predetermined portion of the spectral region to which said article is transparent.

10. An article as defined in claim 1 wherein the radiation to which said sheet has a substantial degree of transparency is visible light radiation, the transparency-attenuating effect of said screen is its visible light transparency-attenuating effect, said first layer has a substantial visible light reflecting characteristic, and the transparency of said article is greater in such at least one zone than at other regions thereof with respect to visible light.

11. An arrangement as defined in claim 10 wherein said screen also serves to reduce the transparency of said article to infrared radiation.